(12) United States Patent
Hua et al.

(10) Patent No.: US 11,714,198 B2
(45) Date of Patent: Aug. 1, 2023

(54) SINGLE-EPOCH PSEUDO-RANGE POSITIONING UNDER VARYING IONOSPHERE DELAYS

(71) Applicant: STAR ALLY INTERNATIONAL LIMITED, Tortola (VG)

(72) Inventors: Wensheng Hua, Fremont, CA (US); Jie Ding, Plymouth, MN (US)

(73) Assignee: STAR ALLY INTERNATIONAL LIMITED, Tortola (VG)

(*) Notice: Subject to any disclaimer, the term of this patent is extended or adjusted under 35 U.S.C. 154(b) by 102 days.

(21) Appl. No.: 16/894,492

(22) Filed: Jun. 5, 2020

(65) Prior Publication Data

US 2020/0386896 A1     Dec. 10, 2020

Related U.S. Application Data

(60) Provisional application No. 62/858,002, filed on Jun. 6, 2019.

(51) Int. Cl.
*G01S 19/21* (2010.01)
*G01S 19/07* (2010.01)
(Continued)

(52) U.S. Cl.
CPC ............ *G01S 19/21* (2013.01); *G01S 19/072* (2019.08); *G01S 19/31* (2013.01); *G01S 19/07* (2013.01); *G01S 19/396* (2019.08); *G01S 19/42* (2013.01)

(58) Field of Classification Search
CPC ........ G01S 19/21; G01S 19/072; G01S 19/31; G01S 19/07; G01S 19/42; G01S 19/43;
(Continued)

(56) References Cited

U.S. PATENT DOCUMENTS 5,552,794 A * 9/1996 Colley .................... G01S 19/42
                                                                342/357.35
6,799,116 B2 * 9/2004 Robbins .................. G01S 5/009
                                                                73/178 R (Continued)

OTHER PUBLICATIONS

"PCT Search Report and Written Opinion, PCT/US2020/036449", dated Sep. 9, 2020, 12 pages.

*Primary Examiner* — Chuong P Nguyen
(74) *Attorney, Agent, or Firm* — Edward C. Kwok; VLP Law Group LLP

(57) ABSTRACT

A positioning method that into account frequently changing ionosphere delays. The method includes: (a) including, in the pseudo-range determination associated with each signal received from various signal sources, a function that represents the environmental bias by one or more parameters, in addition to parameters representing the position of the signal receiver and a clock drift of the signal receiver; and (b) jointly solving for values of the parameters of the function and the parameters representing the position of the signal receiver and the clock drift of the signal receiver. The environmental bias may be an ionosphere delay, which may be modeled by a function having parameters that relate to an Ionosphere Pierce Point (IPP) of the signal received. The function may characterize the ionosphere delay as a function of variations in longitude and latitude from the signal source.

15 Claims, 2 Drawing Sheets

(51) Int. Cl.
*G01S 19/31* (2010.01)
*G01S 19/42* (2010.01)
*G01S 19/39* (2010.01)

(58) Field of Classification Search
CPC ...... G01S 19/426; G01S 19/396; G01S 19/40; G01S 5/14; G01S 5/145
USPC ............ 342/357.59, 357.44, 357.24, 357.25, 342/357.26
See application file for complete search history.

(56) References Cited

U.S. PATENT DOCUMENTS

| | | | |
|---|---|---|---|
| 6,862,526 B2 * | 3/2005 | Robbins | G01S 19/072 701/469 |
| 7,289,061 B2 * | 10/2007 | Komjathy | G01S 19/072 342/357.44 |
| 7,576,689 B2 * | 8/2009 | Weedon | G01S 5/021 342/357.62 |
| 7,868,820 B2 * | 1/2011 | Kolb | G01S 19/071 342/357.26 |
| 7,877,207 B2 * | 1/2011 | Powe | G01S 5/009 701/469 |
| 8,131,463 B2 * | 3/2012 | Lopez | G01S 19/08 701/469 |
| 8,451,168 B2 * | 5/2013 | Henkel | G01S 19/44 342/357.44 |
| 9,121,932 B2 * | 9/2015 | Janky | G01S 19/40 |
| 9,316,740 B2 * | 4/2016 | Ghinamo | G01S 19/426 |
| 10,281,587 B2 * | 5/2019 | Drescher | G01S 19/13 |
| 11,442,173 B2 * | 9/2022 | Kim | G01S 19/39 |
| 2004/0204852 A1 | 10/2004 | Robbins | |
| 2007/0027624 A1 | 2/2007 | Powe et al. | |
| 2011/0244891 A1 | 10/2011 | Ghinamo | |
| 2013/0265191 A1 | 10/2013 | Ghinamo | |
| 2014/0292573 A1 | 10/2014 | Drescher et al. | |
| 2015/0022395 A1 * | 1/2015 | Gou | G01S 19/396 342/357.51 |
| 2016/0377730 A1 | 12/2016 | Drescher et al. | |
| 2020/0209406 A1 * | 7/2020 | Lin | G01S 19/40 |
| 2021/0239845 A1 * | 8/2021 | Sheret | G01S 19/243 |

* cited by examiner

SINGLE-EPOCH PSEUDO-RANGE POSITIONING UNDER VARYING IONOSPHERE DELAYS

CROSS REFERENCE TO RELATED APPLICATIONS

The present invention is related to and claims priority of U.S. provisional application, Ser. No. 62/858,002, entitled "Single-Epoch Pseudo-Range Positioning Under Varying Ionosphere Delays," filed on Jun. 6, 2019, and is hereby incorporated by reference in its entirety.

BACKGROUND OF THE INVENTION

1. Field of the Invention

The present invention relates to signal processing. In particular, the present invention relates accurately processing a signal transmitted from a positioning satellite to determine a pseudo-range (i.e., the distance between the signal receiver and the transmitting satellite).

2. Discussion of the Related Art

In a global navigation satellite system (GNSS), such as GPS, GLONASS, Galileo and Beidou, each satellite transmits a ranging signal of known format ("navigation signal"). Using these navigation signals, a receiver may accurately estimate its position based on measuring pseudo-ranges relative to a sufficiently large number (e.g., four or more) of such satellites. An accurate position estimate based on pseudo-range measurements not only provides a better search range for phase measurement—which is essential for high-precision positioning (e.g., down to centimeter-accuracy) it also greatly reduces the computational cost, in terms of time and energy, in achieving such high accuracy positioning. Position estimates based on pseudo-ranges are widely used in GNSS for such applications as surveying, geophysics and geodesy. However, estimating the position in a robust way remains a challenging task, as various sources of interference are inevitably present in the environment, including thermal noise in the receiver and various other interferences ("environmental biases") in the signal transit paths between the source satellites and the GPS receiver. One such interference is due to the ionosphere, which is a 85- to 600-kilometer thick layer of ions and free electrons in the upper part of Earth's atmosphere. As a navigation signal transits through the ionosphere, it may experience scattering that contributes to a signal delay ("ionosphere delay").

The position of a GPS receiver is typically estimated from a snapshot of instantaneous GPS measurements using, for example, first-order approximation of the positioning equations and a generalized least-squares method. Ionosphere delay may be modeled as an "RMS ionospheric range error."

In the article entitled "Ionospheric Time-Delay Algorithms for Single-Frequency GPS Users," IEEE Transactions on Aerospace and Electronic Systems (3), pp. 325-331, J. Klobuchar discloses an empirical approach to determining the ionospheric error. There, Klobuchar proposes to have GPS satellites broadcast the parameters of his ionospheric model (the "Klobuchar Model") for single frequency users. The Klobuchar Model models the ionosphere as an electron-concentrated thin layer at a height of 350 kilometers. Based on this assumption, Klobuchar computes a "slant delay," which is the delay experienced by a navigation signal entering the ionosphere vertically at the Ionospheric Pierce Point (IPP) multiplied by a "slant factor." While the Klobuchar Model aims to minimize both user computational complexity and user computer storage, it ignores the varying nature of the ionosphere delay that is experienced by a fast-moving receiver. The ionosphere delay varies for a receiver, for example, as the receiver moves from one location to another location. Typically, the Klobuchar parameters are updated at intervals that are greater than one day, during which time the ionosphere delay is outdated due to intrinsic noises. More importantly, in high-precision positioning—which integrates pseudo-range measurements with carrier phase measurements excluding the bias due to time-varying ionosphere noises is especially crucial to an accurate pseudo-range position estimate.

SUMMARY

The present invention provides a positioning method that takes into account frequently changing ionosphere delays. Such a method is particularly suitable for navigation of fast-moving vehicles or unmanned aerial vehicles inside cities or adversarial fields. For example, one method of the present invention includes: (a) including, in the pseudo-range determination associated with each signal received from various signal sources, a function that represents the environmental bias by one or more parameters, in addition to parameters representing the position of the signal receiver and a clock drift of the signal receiver; and (b) jointly solving for values of the parameters of the function and the parameters representing the position of the signal receiver and the clock drift of the signal receiver. In one embodiment, the environmental bias may be an ionosphere delay, which may be modeled by a function having parameters that relate to an Ionosphere Pierce Point (IPP) of the signal received. The function may characterize the ionosphere delay as a function of variations in longitude and latitude from the signal source.

According to one embodiment of the present invention, the method determines terms characterizing the ionosphere delays by: (a) determining a position of each signal source; (b) determining a position of the receiver based on an initial estimate of the position of the receiver without accounting for the environmental bias; (c) determining a position for the IPP of each signal based on the position of each signal source and the position of the receiver; (d) determining the terms in the function associated with each signal based on the position of the receiver, the position of the signal source; and (e) repeating steps (a) to (d) one or more times.

The method of the present invention solves jointly the values of the parameters of the environmental bias, the position of receiver and the position of the clock drift using a set of linear equations. The linear equation may be solved using a least-squares method or any suitable regression method (e.g., a linear regression method). In one embodiment, the least-squares method is a weighted least-squares method based on weights related to variances of a thermal noise.

The present invention is better understood upon consideration of the present invention in conjunction with the accompanying drawings.

DETAILED DESCRIPTION OF THE PREFERRED EMBODIMENTS

Figure 1:
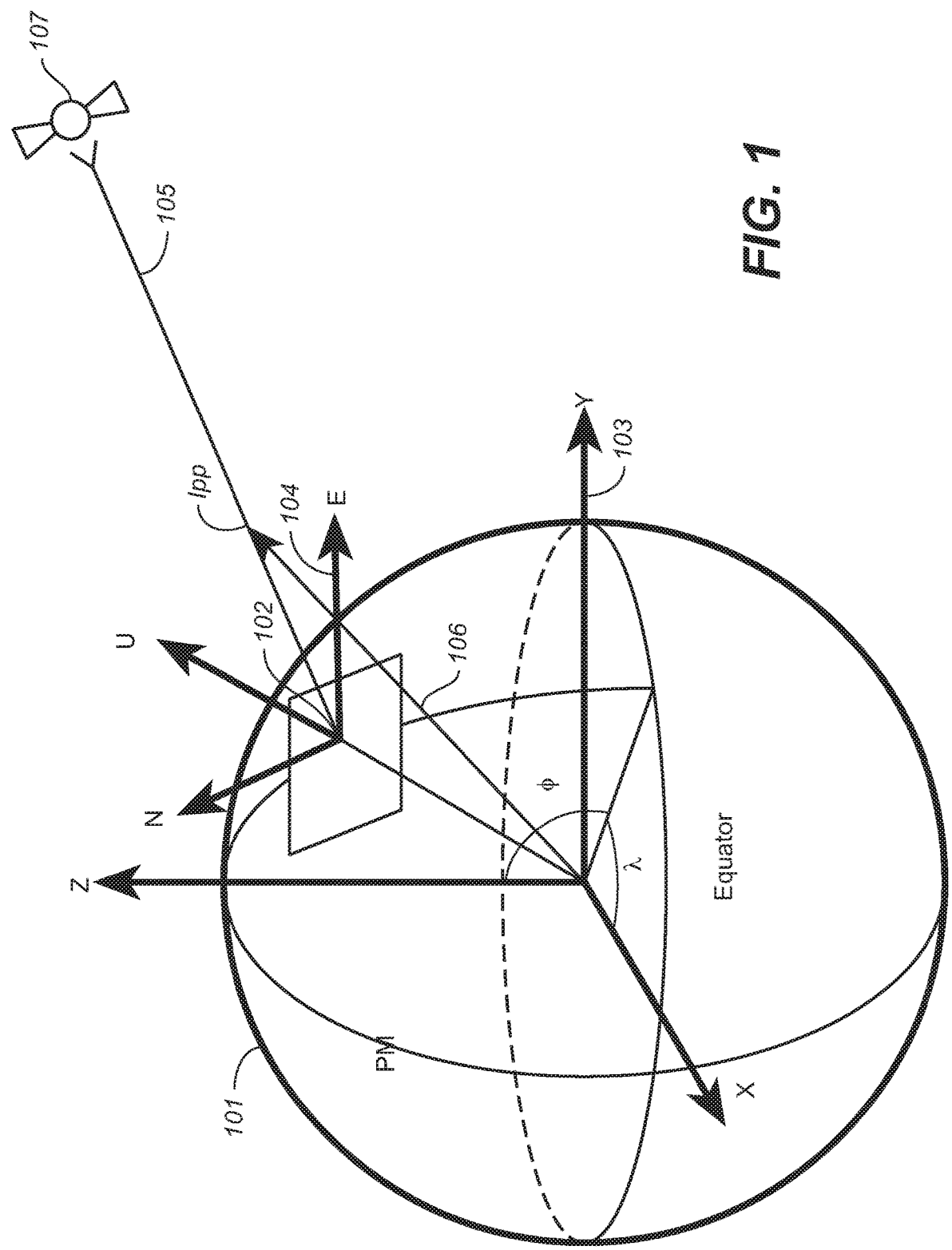
FIG. 1 illustrates the Earth-centered, Earth-fixed (ECEF), the latitude-longitude and the East-North-Up (ENU) coordinate systems.

To illustrate the embodiments of the present invention described herein, this detailed description uses several systems of coordinates familiar to those of ordinary skilled in the art. FIG. 1 illustrates the Earth-centered, Earth-fixed (ECEF), the latitude-longitude and the East-North-Up (ENU) coordinate systems. As shown in FIG. 1, cartesian coordinate system (X, Y, Z) 103 has its origin defined at the center of sphere 101. In a positioning application, sphere 101 represents the earth and cartesian coordinate system 103 is referred to as the ECEF coordinate system. On sphere 101, orthogonal great circles "Prime Meridian" (PM) and Equator, defined on the X-Z and X-Y planes, respectively, are assigned 0° longitude and 0° latitude. Longitudes are defined along the great circles, each indexed by its angle $\lambda$ relative to the plane of the PM. On Earth, by convention, a longitude is referred to as $\lambda°$ E, for $0° \leq \lambda \leq 180°$, and as $\lambda°$ W, for $0° \leq -\leq 180°$. Latitudes are defined on the circles of sphere 101 that parallel the Equator, each indexed by angle $\Phi$ relative to the equatorial plane. Latitudes of earth are referred to as $\phi°$ N, for $0° \leq \phi \leq 90°$, and as $\phi°$ S, for $0° \leq -\phi \leq 90°$.

Unless otherwise specified, this detailed description uses the ENU coordinate system when referring to positions relative to the signal receiver, typically located on the surface of the earth. For example, FIG. 1 shows origin 102 of ENU reference frame 104 at a point on sphere 101. The N-axis is along the direction of the tangent to the receiver's longitude and the E-axis is along the tangent of the receiver's latitude. The U-Axis is along the direction of the line joining the origin of sphere 101 to the receiver's position.

Figure 2:
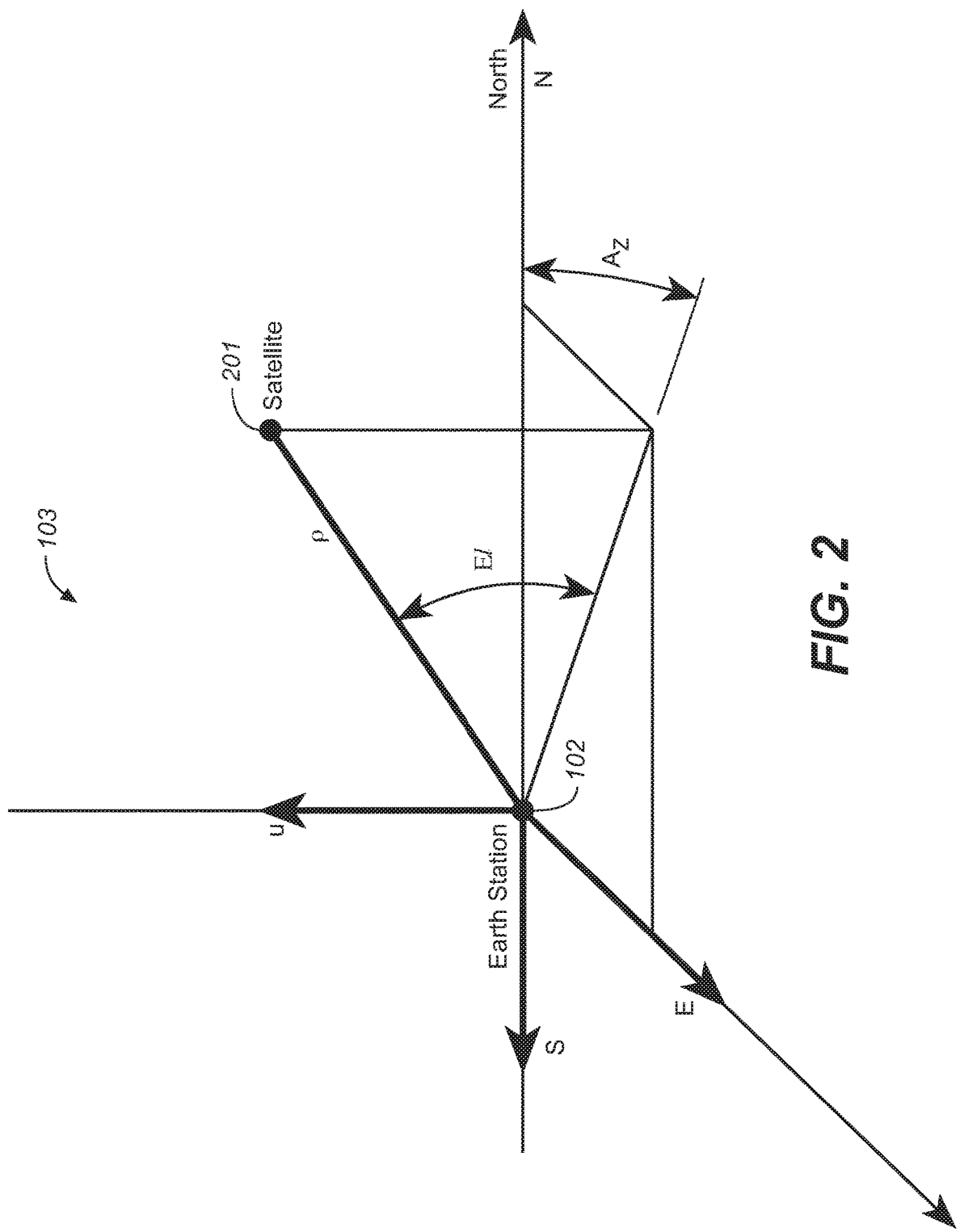
FIG. 2 is an example illustrating specification of the position of satellite 201 relative to a receiver at origin 102 of ENU reference frame 104.

FIG. 2 is an example illustrating specification of the position of satellite 201 relative to a receiver at origin 102 of ENU reference frame 103. As shown in FIG. 2, the position of satellite 201 may be specified by $\rho$, which is the distance from origin 102, angle $A_Z$ ("angle of azimuth"), which is relative to the N-axis in the E-N plane, and angle El ("angle of elevation") relative to the E-N plane.

According to one embodiment, a method of the present invention begins with K "usable" satellites, which are satellites whose signals are believed available to a receiver. The usable satellites may be identified, for example, by a pre-processing step that eliminates satellites whose signals are believed to be out of range of the receiver, or are otherwise excludable, at the time of signal measurement. In one embodiment, the satellites at angles of elevation less than 15° are also excluded. Referring to FIG. 1, FIG. 1 shows the signal of satellite 107 is arrives at the receiver over path 105. The IPP is indicated in FIG. 1 at the point where path 105 intersects the ionosphere. Vector 106 indicates the position of the IPP n the ECEF coordinate system. For each usable satellite, say the i-th usable satellite, i=1, ... K, a method of the present invention determines (i) the satellite's location $s_i = [x_i, y_i, z_i]^T$ in ECEF coordinates, (ii) the received signal's nominal transmit time $t_i$ and (iii) the received signal's time t of reception, according to the receiver's clock. The method further models an unknown receiver clock drift $d_t$ and a zero-mean Gaussian thermal noise $n_i$, with variance $\sigma_i^2$.

The method models the ionosphere delay $g_\beta(s_i, r)$ as a function of satellite location $s_i$, the receiver's location $r = [x, y, z]^T$ and a set of unknown coefficients $\beta = [\beta_0, \beta_1, \beta_2]^T$ associated with the satellite.

The i-th pseudo-range $t - t_i$, in time units, is given by the observational equation:

$$t - t_i = c^{-1} \|s_i - r\| + g_\beta(s_i, r) + d_t + n_i \quad (1)$$

where c is the speed of light and $\|s_i - r\| = \sqrt{(x - x_i)^2 + (y - y_i)^2 + (z - z_i)^2}$ is the Euclidean distance between the i-th satellite and the receiver.

In one embodiment, the ionosphere delay $g_\beta(s_i, r)$ may be defined by a linear function, such as:

$$g_\beta(s_i, r) = f_i \cdot (\beta_0 / \beta_1 (\alpha_{P,i} - \alpha) + \beta_2 (o_{P,i} - o)) \quad (2)$$

where (i) $f_i$ is the "slate factor," which is a function of location $s_i$ of the satellite and location r of the receiver, and (ii) coefficient $\beta_0$ represents the ionosphere delay for a signal entering the atmosphere along the U-axis of the receiver, $(\alpha_{P,i} - \alpha)$ is the deviation in latitude of the IPP of the received i-th satellite's signal relative to the receiver's latitude ("IPP latitude deviation"), and $(o_{P,i} - o)$ is the deviation in longitude of the IPP of the i-th satellite's signal relative the receiver's longitude ("IPP longitude deviation"). In this model, therefore, coefficients $\beta 3_1$ and $\beta_2$ represent the corrections to ionosphere delay associated with each unit of IPP latitude deviation and associated with each unit of IPP longitude deviation, respectively.

As each slant factor $f_i$ and the longitude and latitude of each IPP depend on unknown receiver location r, one embodiment of the present invention calculates them iteratively, applying the most recent receiver location estimate $\hat{r}$ to estimate ionosphere delay $\hat{g}_\beta(\bullet)$, which in turn updates receiver location estimate $\hat{r}$. The initial value for receiver location estimate $\hat{r}$ may be obtained using a conventional method without accounting for the ionosphere delay, i.e., setting the ionosphere delay to zero. In practice, even one iteration already gives a reasonable result.

The ionosphere delay vector $g_\beta$, representing ionosphere delays for the usable satellites may be given by:

$$g_{\beta c} = [g_\beta(s_1, r), g_\beta(s_2, r), \ldots, g_\beta(s_K, r)]^T = A_{iono} * \beta^T \quad (3)$$

where $A_{iono}$ is the ionosphere delay matrix, which is a K×3 matrix, where the i-th row is given by:

$$A_{iono}^i = [\alpha_{i1}, \alpha_{i2}, \alpha_{i3}] \quad (3a)$$

The following steps use satellite locations $s_i$, i=1, ..., K and receiver location estimate $\hat{r}$ to calculate matrix $A_{iono}$:

(a) determine in radians angle of elevation $el_i$ and angle of azimuth $A_{Zi}$ of the i-th satellite, for i=1, ... K, relative to the receiver;

(b) determine latitude $\alpha_i$ and longitude $o_i$ of the i-th satellite, for i=1, ... K;

(c) determine latitude $\alpha$ and longitude o of the receiver;

(d) transform angle of elevation $el_i$ to earth-centered angle $\varphi$, $$\varphi = \frac{0.137}{el_i + 0.11} - 0.022;$$

(f) determine latitude $\alpha_{P,i}$ for the IPP of each satellite, $\alpha_{P,i}=\alpha_i+\varphi \cos Az_i$, $i=1, \ldots, K$;

(g) determine longitude $o_{P,i}$ for the IPP of each satellite, $$o_{P,i} = o_i + \varphi \frac{\sin Az_i}{\cos a_{P,i}}, i = 1, \ldots, K;$$

(h) determine slant factor $f_i=1+16 \cdot (0.53-el_i)^3$, $i=1, \ldots, K$; and (i) determine ionosphere delay matrix $A_{iono}$, having K rows, with the i-th row being $[\alpha_{i1}, \alpha_{i2}, \alpha_{i3}]=[f_i, f_i \cdot (\alpha_{P,i}-\alpha), f_i \cdot (o_{P,i}-o)]$, $i=1, \ldots, K$.

According to one embodiment of the present invention, the unknown parameters r, $d_r$, and $\beta$ of equation (1) are jointly estimated using a first-order Taylor expansion:

$$\|r - s_i\| = \|\hat{r} - s_i\| + \Delta r^T \frac{\hat{r} - s_i}{\|\hat{r} - s_i\|}$$

where $\Delta r$ is the error of the receiver location estimate, given by:

$$\Delta r = r - \hat{r}$$

The unknown parameters to be solved may be grouped into vector $\zeta=[\beta, \Delta r^T, d_r]^T$, and the following quantities may be defined:

(i) vector $q=[q_1, q_2, \ldots, q_K]^T$, with $q_i=t-t_i-c^{-1}\|s_i-\hat{r}\|$, and (ii) Gaussian noise vector $n=[n_1, n_2, \ldots, n_K]^T$, Grouping together all the pseudo-range equations (i.e., all equation (1)'s, $i=1, \ldots, K$), and rearranging, one obtains the vector equation:

$$q = X\zeta + n \quad (4)$$

where augmented design matrix X is a K×7 matrix, which is formed by merging K×3 matrix $A_{iono}$, with the K×4 matrix whose i-th row is given by:

$$\left[\frac{\hat{r} - s_i}{c\|\hat{r} - s_i\|}, 1\right] \quad (5)$$

Equation (4) includes 7 unknowns, and thus requires pseudo-range measurements on at least 7 satellites. With 7 or more satellites, a weighted least-squares or any suitable regression method can be used to solve for the unknowns. For example, when the variances $\sigma^2$'s of the Gaussian noise vector n are known, one may use the diagonal matrix $W=\text{diag}(\sigma_1^{-2}, \sigma_2^{-2}, \ldots, \sigma_K^{-2})$. The variances may be estimated from thermal noise measurements. In that embodiment, the solution to the unknown values is given by:

$$\zeta = (X^T W X)^{-1} X^T W q \quad (6)$$

Note that equation (1) does not expressly include a term for a delay due to the rest of the atmosphere. The values of coefficients $c_0$, $c_1$ and $c_2$ in the linear ionosphere model described above vary over distances. Differences in the coefficient values between two locations sufficiently far apart include contributions in delay due to a difference in weather condition (e.g., the partial pressures of water vapor) between the two locations. Thus, the coefficients determined may be correlated with weather condition and be used for weather forecast purposes.

The method of the present invention may be extended to include additional non-linear (e.g., second order) terms in ionosphere delay $g_\beta(s_i,r)$. In that case, vector $\zeta$ is augmented to include additional unknown parameters that correspond to the coefficients of the added non-linear terms in ionosphere delay $g_\beta(s_i,r)$. The values of the additional unknown parameters can then be solved jointly with the other unknown parameters using the method of the present invention described above.

The above detailed description is provided to illustrate specific embodiments of the present invention and is not intended to be limiting. Various modifications and variations within the scope of the present invention are possible. The present invention is set forth in the accompany claims.

We claim:

1. A method for determining a position of a signal receiver based on signals received from a plurality of signal sources, wherein the signal receiver having a clock with a clock drift that is unknown at the time the signals are received, the method accounting for an environmental bias, comprising:

determining (i) a nominal arrival time of each received signal, using the clock of the signal receiver; (ii) a nominal transit time of teach signal; and (ii) a nominal position of each signal source;

including the determined nominal arrival time of each signal, the determined nominal transit time of each signal source, and the determined nominal position of each signal source in a system of pseudo-range equations, each pseudo-range equation having as unknown (i) the signal receiver's position, (ii) values of one or more parameters in a function that represents the environmental bias, and (iii) the clock drift of the signal receiver; and solving the system of equations for the values of the parameters of the function, the signal receiver's position and the clock drift of the signal receiver.

2. The method of claim 1, wherein the environmental bias comprises an interference from earth's ionosphere.

3. The method of claim 2, wherein the parameters associated with the parameters of the function comprise coefficients of terms that characterize an Ionosphere Pierce Point of the signal received (IPP).

4. The method of claim 3, wherein the terms characterize variations in longitude and latitude from a longitude and a latitude of the signal source associated with the signal received.

5. The method of claim 3, further comprising a factor that is multiplied to each coefficient.

6. The method of claim 5, wherein the parameters of the function for the signal of each signal source are obtained by:

(a) determining a position of each signal source;

(b) estimating the position of the receiver without accounting for the environmental bias;

(c) determining a position for the IPP of each signal based on the position of each signal source and the estimated position of the receiver;

(d) determining the terms in the function associated with each signal based on the estimated position of the receiver, the position of the signal source; and (e) repeating steps (a) to (d) one or more times.

7. The method of claim 6, wherein the position of each signal source is expressed as latitude, longitude and height.

8. The method of claim 6, further comprising determining in radians an angle of elevation and an angle of azimuth of each signal source relative to the receiver.

9. The method of claim 6, further comprising determining a slant factor at the IPP of each signal.

10. The method of claim 1, wherein jointly solving for values of the parameters comprise solving a set of linear equations.

11. The method of claim 10, wherein solving the set of linear equation comprises using a least-squares method.

12. The method of claim 11, wherein the least-squares method comprises a weighted least-squares method.

13. The method of claim 12, wherein the weighted least-squares method uses weights related to thermal noise.

14. The method of claim 13, wherein the weights comprise variances of thermal noise in each signal source.

15. The method of claim 1, further comprising using the values of the parameters of the function for weather forecast.

\* \* \* \* \*